United States Patent [19]

Morel

[11] Patent Number: 4,470,490

[45] Date of Patent: Sep. 11, 1984

[54] SAFETY COUPLING

[75] Inventor: Louis Morel, Chuyer, France

[73] Assignee: Moteurs Leroy-Somer (Societe Anonyme), Angouleme, France

[21] Appl. No.: 388,729

[22] Filed: Jun. 15, 1982

[30] Foreign Application Priority Data

Jun. 22, 1981 [FR] France .............................. 81 12564

[51] Int. Cl.³ ........................................... B60K 41/20
[52] U.S. Cl. .................................... 192/8 R; 188/167
[58] Field of Search ............... 192/3 TR, 7, 8 R, 144, 192/15, 54, 93 R; 188/72.3, 134, 135, 166, 167; 56/11.3

[56] References Cited

U.S. PATENT DOCUMENTS

| 2,997,146 | 8/1961 | Chiolerio | 192/8 R |
| 3,667,578 | 6/1972 | Johnson | 192/8 R |
| 3,680,672 | 8/1972 | McCurley | 192/8 R |

FOREIGN PATENT DOCUMENTS 2088016 2/1972 France .
2099747 9/1972 France .

Primary Examiner—George H. Krizmanich
Assistant Examiner—M. Manley
Attorney, Agent, or Firm—Karl F. Ross

[57] ABSTRACT

A safety coupling for rapidly stopping a cutting tool or the like upon the de-energization of a driving motor includes an axially movable shell rotating together with a driven shaft and having a flange pressed by a spring toward a frictional braking element. Two parallel cams of generally triangular outline are articulated by their respective vertices to a drive shaft and, in a central position, are aligned with a common axis of the drive and driven shafts. On starting the motor, the resulting differential torque causes a relatively inverse tilting of the cams around a transverse axle whereby they axially shift the shell, against the force of the spring, and release its flange from the braking element. As soon as the motor is cut off, the differential torque vanishes and the cams regain their initial central position whereby the driven tool is arrested.

8 Claims, 8 Drawing Figures

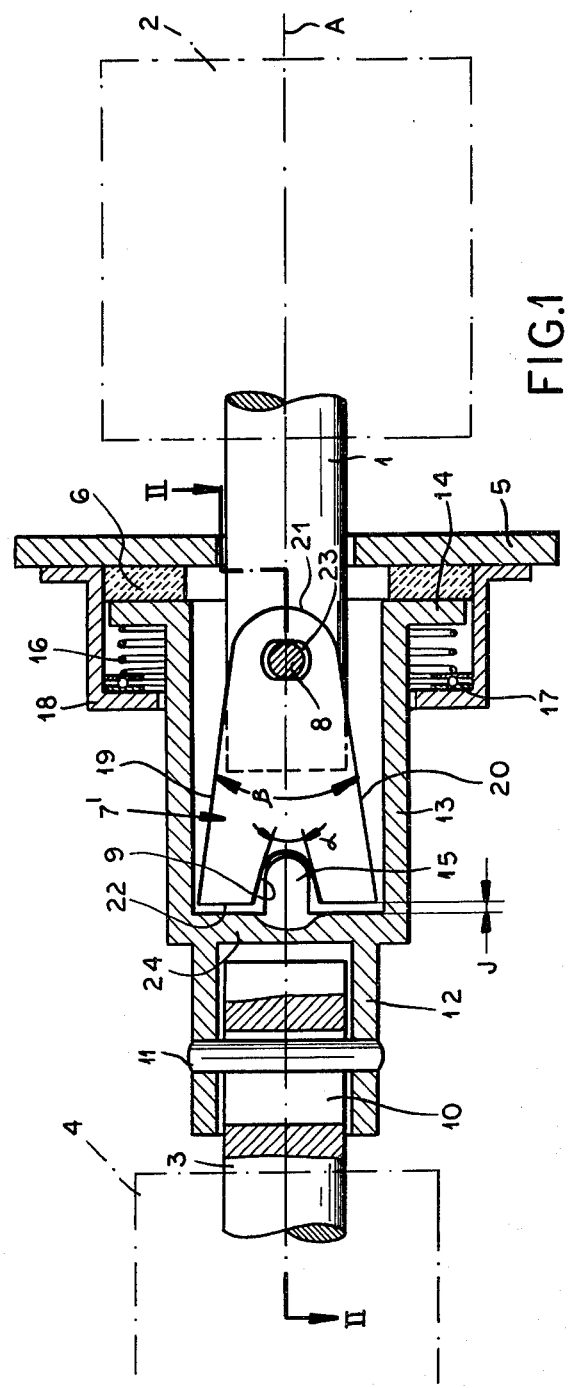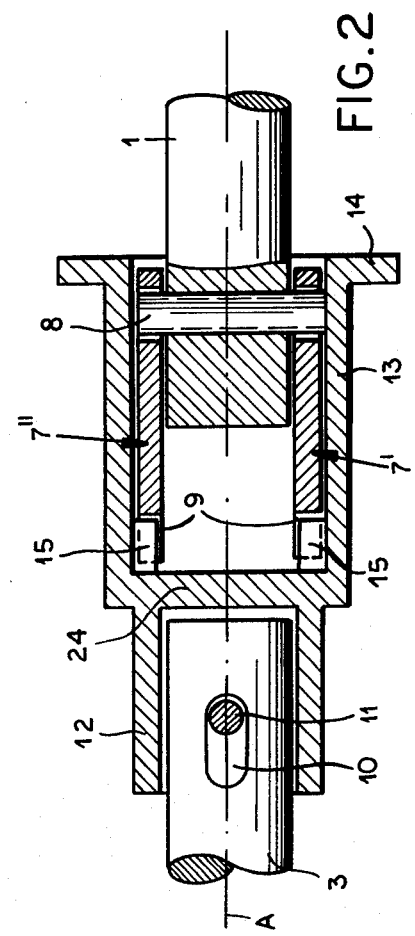

SAFETY COUPLING

FIELD OF THE INVENTION

My present invention relates to a safety coupling interposable between a drive motor and a rotatable load driven thereby. My invention is particularly applicable to electric appliances used by do-it-yourselfers or semi-skilled operators, e.g. to lawn mowers, woodworking machines, gardening saws, cutters, mixers, centrifuges and the like.

BACKGROUND OF THE INVENTION

In the operation of these appliances, inertial forces tend to cause continued rotation of their tools for a considerable period after deactivation of the motor. This could cause injury to a person unaware of that continuing rotation, the risk of such injury being especially great in the case of equipment whose rotation is virtually noiseless. Appliances of this type are therefore conventionally provided with safety couplings including drum or disk brakes designed to arrest the load as soon as the motor is de-energized; these prior-art devices, however, are often cumbersome and relatively expensive, e.g. on account of their use of powerful magnets, and in many instances work rather abruptly, thereby causing shocks which eventually may damage the implement.

OBJECT OF THE INVENTION

The general object of my present invention, therefore, is to provide a safety coupling ensuring practically immediate but gentle stopping of a rotatable cutting tool or other load upon the de-energizing of an associated drive motor.

Another object of the present invention is to provide a simple and inexpensive structure for a safety coupling of this nature.

A further object of my invention is to eliminate, in such a safety coupling, the need for additional energy in the actuation of a load-braking mechanism.

SUMMARY OF THE INVENTION

I realize these objects, in accordance with my present invention, by providing a safety coupling with a link member having opposite ends articulated to a drive shaft and to an axially movable extension of a driven shaft for transmitting torque from a motor to a load. In the presence of a differential torque generated between these opposite ends, the link member is distorted and exerts upon the extension of the driven shaft a force disengaging that extension from a braking element with which it is normally held in contact by biasing means such as a coil spring. If the driven shaft is axially shiftable, its extension coacting with the link member may be integral with that shaft; I prefer, however, to design it as a piece corotatingly but relatively slidably connected with that shaft, specifically as a shell surrounding all or part of the link member and possibly also an adjoining end of the drive shaft. The driven shaft, in fact, may be held by a thrust bearing or the like against axial displacement so that an axial force acting upon the load will not be communicated to the relatively slidable extension.

Depending on the configuration of the link member, the shaft extension coacting with the braking element may be axially shifted toward or away from the drive shaft when that member is deformed by a differential torque applied to its extremities. In the embodiment more fully described hereinafter, that link member is tiltable in a plane substantially parallel to the shaft axis whereby an eccentric formation thereof bears axially upon the shiftable shaft extension. This member advantageously comprises a generally triangular cam, or preferably two such cams disposed on opposite sides of the axis for mutually independent pivotal motion in opposite directions, each cam having a vertex and a base pivotable about respective joints by which they are articulated to the drive shaft and to the extension of the driven shaft. The eccentric formation bearing axially upon that shaft extension is then part of the base of the triangle whose lateral edges diverge toward that base from the vertex at a small acute angle; when the shaft extension is a shell as mentioned above, the base confronts a transverse internal shoulder of the shell while its lateral edges come to rest against an inner wall surface of the shell in respective limiting angular positions of the two shafts.

BRIEF DESCRIPTION OF THE DRAWING

The above and other features of my present invention will now be described in detail with reference to the accompanying drawing wherein:

FIG. 1 is an axial sectional view of a safety coupling according to my invention, interposed between a drive motor and a driven load, in a normal position holding that load against rotation;

FIG. 2 is an axial sectional view of the safety coupling taken substantially along the line II—II of FIG. 1;

SPECIFIC DESCRIPTION

Figure 3:
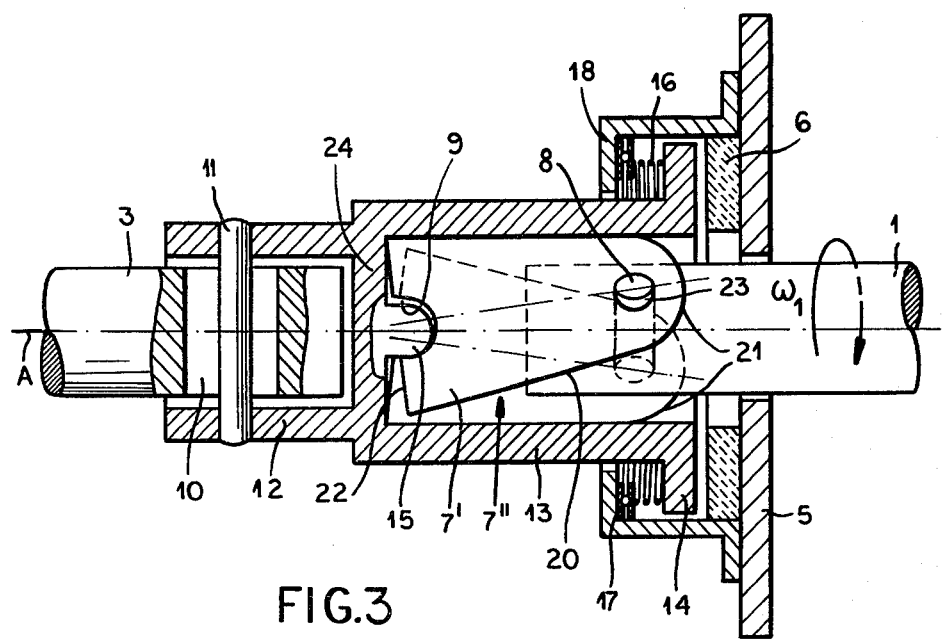
FIGS. 3 and 4 are sectional views, similar to those of FIGS. 1 and 2, showing the coupling in a released position enabling rotation of the load by the drive motor in respective directions.

A safety coupling according to my invention, as shown in FIGS. 1-4 and 8, includes a drive shaft 1 operatively connected to an electric motor 2 here assumed to be of the reversible type. A driven shaft 3 coaxial with the drive shaft 1 carries a load 4, e.g. a cutting tool, to be rotated by the motor 2. The drive shaft 1 traverses a central aperture in a fixed mounting plate 5 provided with a friction lining 6.

Driven shaft 3, held against axial shifting by a nonillustrated thrust bearing on a structure rigid with mounting plate 5, has an extension in the form of a shell 13 with a sleeve 12 coupled with that shaft for joint rotation by a transverse pin 11 passing through a slot 10 in the shaft; shell 13 is thus limitedly slidable, relatively to shaft 3, along the common shaft axis A.

Figure 8:
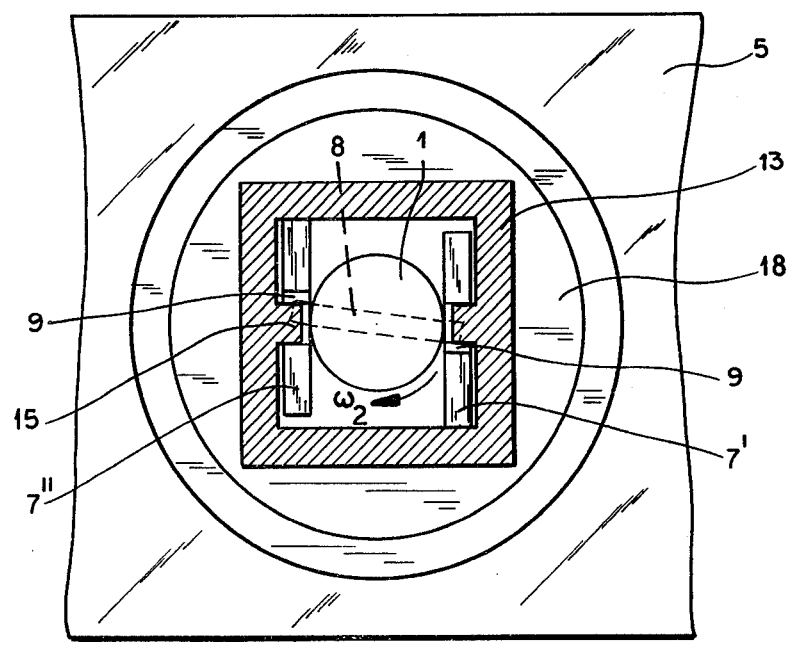
FIG. 8 is a cross-sectional view of the coupling taken substantially along th line VIII—VIII of FIG. 4.

The open end of shell 13 opposite sleeve 12 has a peripheral flange 14 adjoining the friction lining 6 in a housing 18 attached to plate 5. A coil spring 16, surrounding the shell 13, is braced by a thrust bearing 17 against an end wall of housing 18 and constantly urges the flange 14 toward lining 6. Shell 13 encloses an end of shaft 1 remote from motor 2 as well as a link member coupling that shaft with the shell—and thus with shaft 3—for joint rotation. This link member comprises two parallel cams 7', 7" of identical, generally triangular configuration each having a pair of lateral edges 19, 20 which diverge at a small acute angle β from a vertex 21 to a base 22. Each cam is pivotable at its vertex 21 about a transverse pin 8 by which it is articulated to the free end of shaft 1 with the aid of a universal joint formed, in the simle case illustrated, by a slightly oblong aperture 23 in the cam receiving an extremity of the pin. The bases 22 of the cams are similarly articulated to shell 13 by pivotal joints formed by generally V-shaped cutouts 9, midway along each base, accommodating respective rounded internal bosses 15 projecting from opposite wall surfaces of the shell; the latter, as seen in FIG. 8, has a rectangular cross-section of a height slightly exceeding that of the cams 7', 7" at their bases 22. Cutouts 9 have flanks substantially paralleling the lateral edges 19, 20 and including with each other an acute angle α equal to or exceeding the angle of divergence β of these edges.

The two bosses 15 (which could also be replaced by a throughgoing rib) lie close to a partition 24 confronting the bases 22 of the cams 7', 7".

In the quiescent position of FIGS. 1 and 2, with motor 2 de-energized, shafts 1, 3 are free to assume a relative angular position in which bosses 15 lie on a line parallel to axle pin 8 so as to hold the two cams 7', 7" centered and mutually aligned under the pressure of spring 16. This position provides a clearance J between bases 22 and partition 24 which allows the spring 16 to force the flange 14 of shell 13 into contact with brake lining 6. The position of FIG. 1 has been diagrammatically indicated in FIG. 5 where 0 is the pivotal axis at the vertex 21 of one of the cams 7', 7", d symbolizes the invariable distance of this pivotal axis (represented by pin 8) from brake lining 6, E is the distance between partition 24 and some other fixed reference plane Q (e.g. the location of pin 11) on shaft extension 12, 13 separated from lining 6 by a distance L, P is the midpoint of base 22 engaged by the associated boss 15, and $P_1$, $P_2$ are the extremities of base 22 separated by the clearance J from confronting shoulders formed by partition 24. The pressure of spring 16 has been symbolized by an arrow R.

Figure 6:
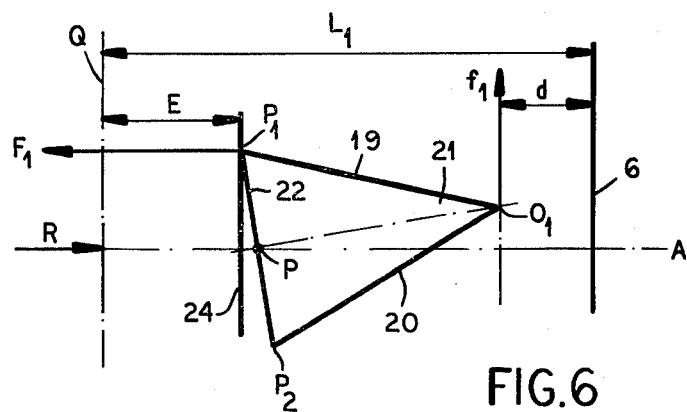

FIGS. 3 and 6 depict the sitation when the drive shaft 1 is rotated in a direction indicated by an arrow $\omega_1$, i.e. counterclockwise as viewed in FIG. 8. With the driven shaft 3 retarded, as by contact between the tool 4 and a workpiece to be shaped thereby, the differential torque developed between the two shafts elevates the vertex 21 of cam 7' into a position $O_1$ with reference to the midpoint P of its base whereby the triangle $O_1$, $P_1$, $P_2$ is tilted by a peripheral force $f_1$; thus, the eccentric point $P_1$ comes to bear upon partition 24 and displaces it to the left, against the force R of spring 16, as indicated in FIG. 6 by an arrow $F_1$. The result is a lengthening of the distance between lining 6 and reference plane Q to a value $L_1$ causing the separation of flange 14 from that lining. Shell 13 and shaft 3 are therefore enabled to follow the rotation of shaft 1 and to drive the tool 4. The other cam 7" (not represented in FIG. 6) is swung symmetrically to cam 7', i.e. into a position similar to that illustrated in FIG. 7, to reinforce the action of its mate.

Figure 5:
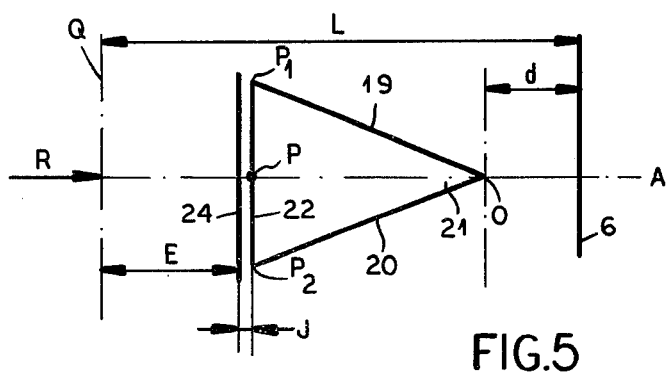
FIGS. 5, 6 and 7 are diagrams illustrating certain elements of the coupling of FIGS. 1-4 in different relative positions.

If the rotating tool 4 is removed from the workpiece so that the drag exerted upon shaft 3 ceases, the cams will tend to resume the neutral position of FIG. 5 but will be prevented from reaching same since the approach of flange 14 to brake lining 6 will give rise to a frictional resistance re-establishing a differential torque.

When, however, the motor 2 is de-energized, this frictional resistance will promptly arrest the shaft 3 and its load on account of the disappearance of the axial thrust $F_1$ opposing the spring force R.

Figure 4:
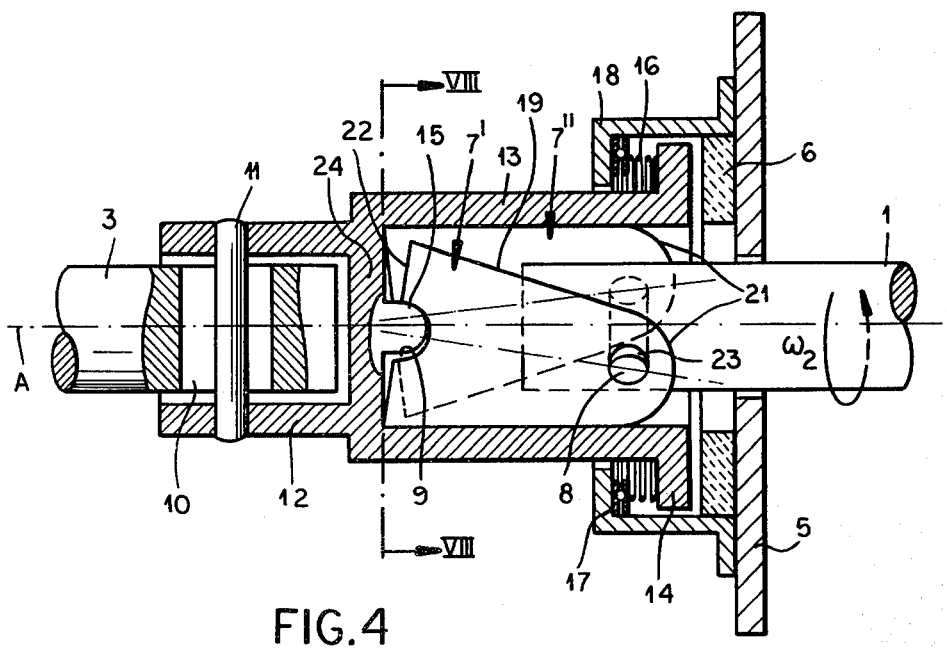
Figure 7:
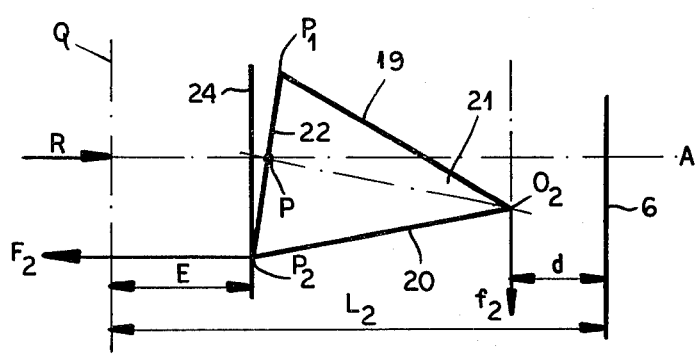

In an analogous manner, a rotation of shaft 1 in the opposite sense $\omega_2$ (clockwise in FIG. 8) will cause cam 7' to assume the position of FIGS. 4 and 7 as its vertex 21 is lowered by a peripheral force $f_2$ into a position $O_2$ relative to the point of attack P of boss 15. The eccentric point $P_2$ of cam 7' will therefore exert upon partition 24 a thrust $F_2$ so as to establish an increased distance $L_2$ between lining 6 and reference plane Q, corresponding to the distance $L_1$ of FIG. 6 for a differential torque of the same absolute magnitude. The companion cam 7", meanwhile, will assume a symmetrically tilted position, similar to that illustrated in FIG. 6, to aid cam 7'. Removal of the tool 4 from its workpiece and de-energization of motor 2 will again have the effects described above.

Though I have illustrated only two cams 7', 7" as part of the link member, the latter may be provided with any convenient number of such cams in dependence upon the axial thrust to be exerted. The link member could also be of different construction, e.g. such that a differential torque shortens instead of lengthens the distance between a reference plane of the driven shaft extension and a stationary braking element. In that instance the described mode of operation would be essentially the same if the position of brake lining 6 and spring 16 relative to flange 14 were interchanged, i.e. if that spring were to urge the flange 14 to the left against the end wall of housing 18 provided with that lining. The rectangular cross-section of shell 13 shown in FIG. 8 could be replaced by a circular one, of a diameter approximately equalizing the diagonal of the illustrated rectangle, with suitable lengthening of the bosses 15.

The drive shaft 1 may be an integral part of motor 2 or may be positively connected with the motor shaft. If the driven shaft 3 is axially shiftable in its bearings but in operation is not subject to any significant force component from its load tending to move it toward shaft 1, i.e. to the right in FIGS. 1–4, the shell 13 may be made integral with shaft 3.

I claim:

1. A safety coupling comprising:
   a drive shaft connected to a motor;
   a driven shaft coaxial with said drive shaft connected to a load to be rotated by said motor;
   a stationary braking element;
   biasing means urging an axially movable extension of said driven shaft into contact with said braking element; and
   a link member having opposite ends respectively joined to said drive shaft and to said extension for transmitting torque from said motor to said load, said link member being deformable by a differential torque generated between said opposite ends upon rotation of said drive shaft for exerting upon said extension a force counteracting said biasing means to disengage said extension from said braking element, said opposite ends being articulated to said drive shaft and to said extension at axially separated joints for imparting to said link member a tilting motion, in a plane substantially parallel to the shaft axis, in response to said differential torque whereby an eccentric formation of said link member bears axially upon said extension.

2. A coupling as defined in claim 1 wherein said link member comprises a generally triangular cam having a vertex pivotable about one of said joints and a base opposite said vertex pivotable about the other of said joints, said eccentric formation being part of said base.

3. A coupling as defined in claim 2 wherein said extension is a shell corotatingly but relatively slidably connected with said driven shaft and provided with a flange urged by said biasing means toward said braking element, said shell surrounding at least part of said cam and having a transverse internal shoulder confronting said base.

4. A coupling as defined in claim 3 wherein said biasing means comprises a coil spring surrounding said shell and bearing means bracing said springs against a fixed support.

5. A coupling as defined in claim 3 or 4 wherein said cam has lateral edges diverging from said vertex toward said base, said lateral edges coming to rest against an inner wall surface of said shell in respective limiting relative angular positions of said shafts.

6. A coupling as defined in claim 5 wherein said other of said joints comprises an internal boss on said shell engaging in a generally V-shaped central recess of said base, said recess having flanks diverging at an angle at least equal to the angle of divergence of said lateral edges.

7. A coupling as defined in claim 2, 3 or 4 wherein said cam is one of two substantially identical cams forming part of said link member, said cams being disposed on opposite sides of said shaft axis and being independently pivotable about said joints in mutually opposite directions.

8. A coupling as defined in claim 7 wherein said one of said joints comprises an axle perpendicular to said shaft axis engaging the vertices of both said cams.

* * * * *